W. N. RETTINGER.
TIRE.
APPLICATION FILED MAY 18, 1916.
1,214,590.
Patented Feb. 6, 1917.
2 SHEETS—SHEET 1.
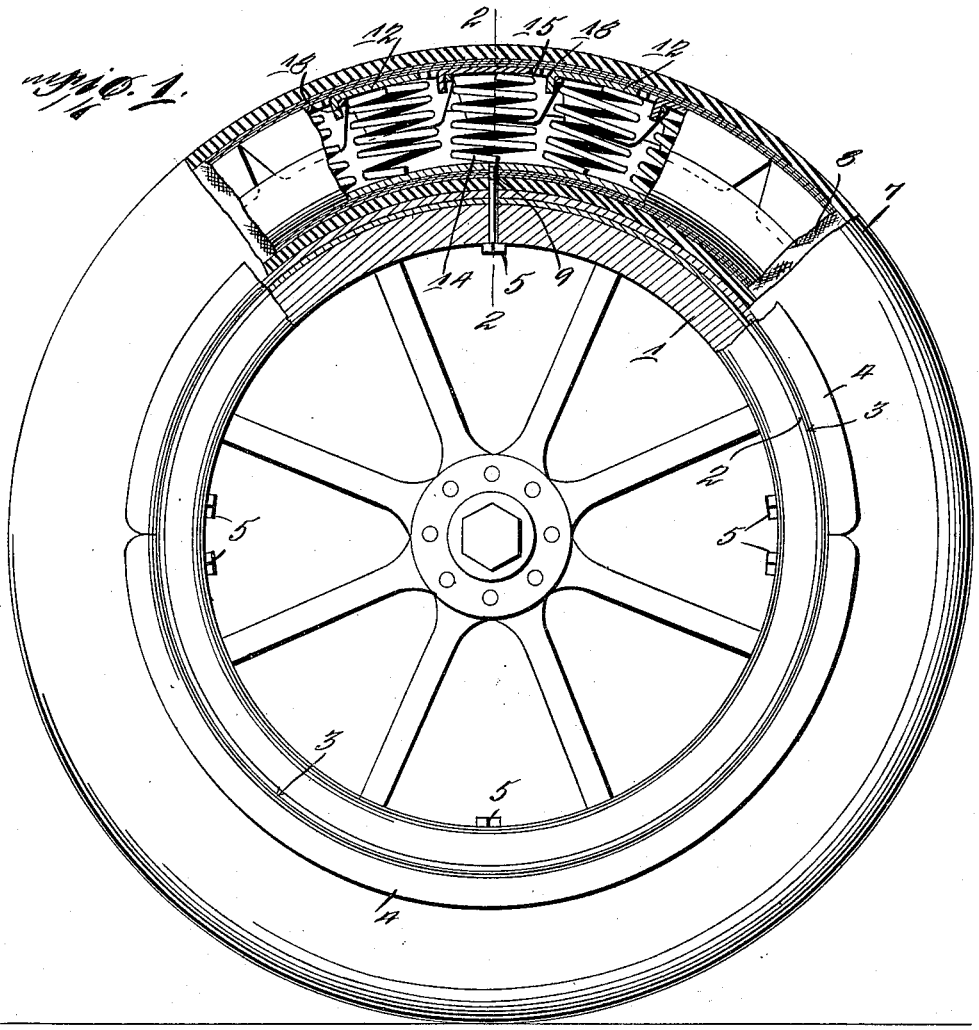
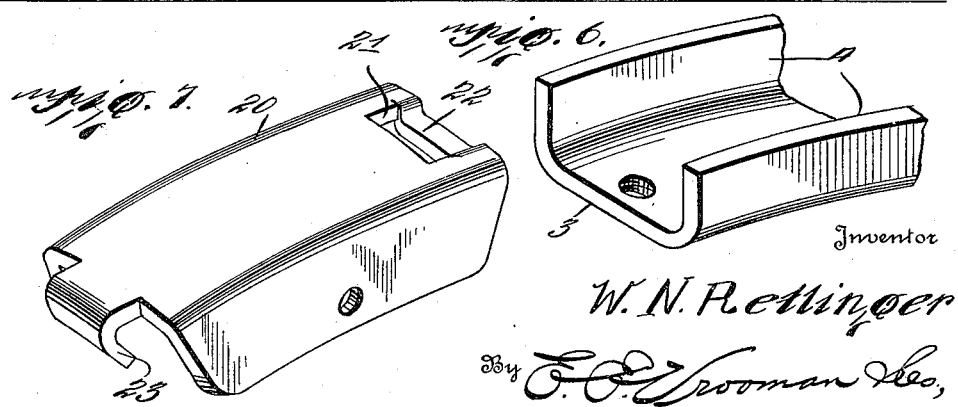
Inventor
W. N. Rettinger
By E. E. Vrooman & Co.,
his Attorneys

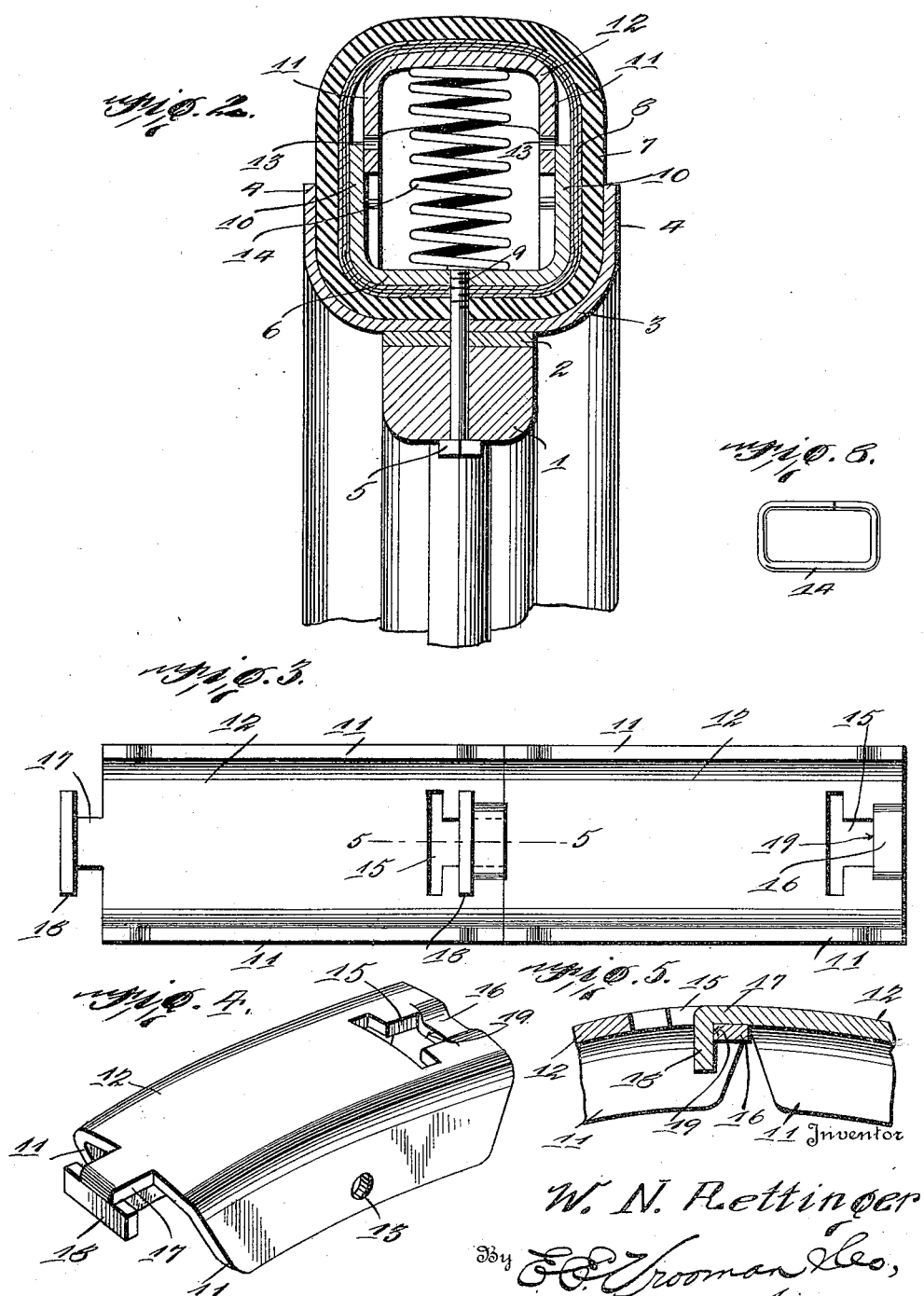

UNITED STATES PATENT OFFICE.

WILLIAM N. RETTINGER, OF BOURBON, INDIANA.

TIRE.

1,214,590.   Specification of Letters Patent.   Patented Feb. 6, 1917.

Application filed May 18, 1916. Serial No. 98,366.

*To all whom it may concern:*

Be it known that I, WILLIAM N. RETTINGER, a citizen of the United States of America, residing at Bourbon, in the county of Marshall and State of Indiana, have invented certain new and useful Improvements in Tires, of which the following is a specification, reference being had therein to the accompanying drawing.

This invention relates to automobile tires and has for its principal object the production of a simple and efficient tire which will eliminate the necessity of employing air for producing the resiliency thereof.

Another object of this invention is the production of a simple and efficient means for producing a puncture proof tire which will possess substantially the same amount of resiliency as a pneumatic tire.

A still further object of this invention is the production of a simple and efficient means for connecting the links upon the tread of the tire, thereby permitting the tire to yield while passing over uneven surfaces.

With these and other objects in view this invention consists of certain novel combinations, constructions, and arrangements of parts as will be hereinafter fully described and claimed.

In the accompanying drawings: Figure 1 is a side elevation of a wheel showing the tire applied thereto, the tire being shown partly in longitudinal section. Fig. 2 is a section taken on the line 2—2 of Fig. 1. Fig. 3 is a bottom plan view of the outer tread links employed in connection with the tire. Fig. 4 is a perspective view of one of the outer tread links. Fig. 5 is a section taken on the line 5—5 of Fig. 3. Fig. 6 is a detail perspective view of one end of the inner channel plate. Fig. 7 is a detail perspective of a modified form of plate used in connection with the present invention. Fig. 8 is a top plan view of the spring used in connection with this invention.

By referring to the drawings it will be seen that 1 designates the felly of the wheel which is provided with a metallic felly band 2, as illustrated clearly in Fig. 2 of the drawings. The channel plate 3 is mounted upon the metallic felly band 2 and is provided with upturned side edges 4. This plate 3 comprises a pair of similarly constructed sections having their ends abutting as illustrated clearly in Fig. 1 of the drawings, and is firmly held in its proper position by means of the bolts 5 which pass through the respective ends of the sections of the plate and also through the center of the plate, thereby holding the channel plate 3 against accidental displacement from the felly 1.

The inner channel plate 6 is mounted within the channel plate 3 and is covered by a resilient covering 7 having an inner fabric lining 8, this lining 8 and casing 7 extending around all of the parts of the tire. The inner ends of the bolts 5 are threaded as indicated by the numeral 9, and these threaded portions 9 engage the channel plate 6, as illustrated in Fig. 2. The channel plate 6 is provided with parallel side flanges 10, which side flanges 10 constitute guides for the inwardly extending flanges 11 of the tread links 12. These flanges 11 of the tread links 12 are provided with apertures 13 to permit the insertion of a tool when so desired in order to allow the links to be coupled with each other. Springs 14 are interposed between the links 12 and the channel plate 6 and are adapted to yieldably force the links 12 outwardly with respect to the channel plate 6. These springs 14 are formed either oblong, as illustrated clearly in Fig. 8 of the drawings, or may be formed circular as is usual with such springs.

Each of the links 12 comprises an elongated body having a substantially T-shaped notch 15 formed therein, and an inwardly bent bridge portion 16 straddles the outer end of the T-shaped notch 15, as illustrated clearly in Fig. 3 of the drawings. The opposite end of the link is provided with a projecting tongue 17 having an inwardly bent T-shaped lip 18, the lip 18 of one link fitting within the T-shaped notch of the adjoining link and abutting against the inner edge 19 of the bridge 16, thereby limiting the expansive movement of the links with respect to each other. It will, therefore, be seen that a simple and efficient means has been produced for holding the links in an assembled relation.

In Fig. 7 there is shown a modification of the invention wherein the body of the link 20 is constructed similar to the link 12, and is provided with an aperture 21 the rear end of which is closed by means of a depressed bridge portion 22 formed integral upon the link 20. The opposite end of the link 20 is provided with a depending inwardly inclined tongue 23, the inwardly inclined tongue of one link fitting within the notch 21 of the adjoining link for constituting an endless series of links to produce the tread portion of the tire. It, of course, should be understood that the outer casing 7 as well as the lining 8 is not a continuous band but is split longitudinally and has its adjoining edges clamped between the bottom of the inner channel plate 6 and the channel plate 3, thereby permitting the insertion of the spring engaging links within the tire.

What is claimed is:—

A resilient tire of the class described comprising an outer casing, a plurality of tread links, each tread link provided with a substantially T-shaped aperture near one end thereof and a substantially T-shaped head at the opposite end thereof, the T-shaped head of one link adapted to fit through the T-shaped notch of the adjoining link for producing an endless chain of links around the tread of a tire, each link provided with an inwardly struck bridge portion at the outer end of each T-shaped notch for constituting a pocket for receiving the neck of said T-shaped head, each tread link provided with side flanges, a channel plate shielding said side flanges, and spring means interposed between said channel plate and tread links for yieldably spacing said tread links and channel plate apart.

In testimony whereof I hereunto affix my signature.

WILLIAM N. RETTINGER.

Copies of this patent may be obtained for five cents each, by addressing the "Commissioner of Patents, Washington, D. C."